United States Patent [19]

Urushibata et al.

[11] Patent Number: 5,057,650

[45] Date of Patent: Oct. 15, 1991

[54] MOLDED CIRCUIT COMPONENT UNIT FOR CONNECTING LEAD WIRES

[75] Inventors: Kenichi Urushibata; Kiyoto Sugawara; Tatsuo Matsuda; Haruo Saen, all of Tochigi; Keiichi Kojima, Kanagawa; Syusaku Kawasaki, Osaka; Hiroshi Hatase, Osaka; Katsuya Saito, Osaka; Tetsuo Yumoto, Tokyo; Norio Yoshizawa, Tokyo; Tooru Kanno, Tokyo, all of Japan

[73] Assignees: Sumitomo Electric Industries, Ltd., Osaka; Matsushita Electric Industrial Co., Ltd., Kadoma; Sankyo Kasei Co., Ltd., Tokyo, all of Japan

[21] Appl. No.: 561,567

[22] Filed: Aug. 2, 1990

[30] Foreign Application Priority Data

Aug. 2, 1989 [JP] Japan .................................. 1-91282
Aug. 2, 1989 [JP] Japan .................................. 1-201022

[51] Int. Cl.[5] .......................................... H02G 15/113
[52] U.S. Cl. .............................. 174/88 R; 174/72 A; 174/94 R; 439/465; 439/466; 439/499
[58] Field of Search ................ 174/88 R, 94 R, 72 A; 439/460, 465, 466, 499

[56] References Cited

U.S. PATENT DOCUMENTS

| | | | |
|---|---|---|---|
| 2,274,087 | 2/1942 | Morten | 174/88 R |
| 4,194,805 | 3/1980 | Ayer et al. | 439/465 |
| 4,323,295 | 4/1982 | Davis, Jr. | 439/465 |
| 4,963,699 | 10/1990 | Urushibata et al. | 174/88 R |

OTHER PUBLICATIONS

Johnson, Jr., D. O.; Transmission Line Cable Connector; IBM Technical Disclosure Bulletin; vol. 9, No. 10; Mar. 1967; pp. 1283-1284.

Flex Cable Termination; IBM Technical Disclosure Bulletin, vol. 29, No. 2; Jul. 1986; pp. 565-566.

*Primary Examiner*—Morris H. Nimmo
*Attorney, Agent, or Firm*—Cushman, Darby & Cushman

[57] ABSTRACT

A molded circuit component for connecting to lead wires includes body and a protective cover. The body includes a partition wall area having a plurality of housing grooves, partition walls, body notches, positioning projections and fastening pin reception apertures. The protective cover includes a plurality of cover notches, recesses and fastening pins to correspond respectively with the body notches, positioning projections and fastening pin reception apertures. Metal lines having connection terminals on their ends are embedded in the housing grooves. Lead wires are positioned in the grooves so that the conductors of the lead wires are placed on, and attached to, the connection terminals. The protective cover is then attached to the body.

12 Claims, 5 Drawing Sheets

MOLDED CIRCUIT COMPONENT UNIT FOR CONNECTING LEAD WIRES

BACKGROUND OF THE INVENTION

1. Field of Invention

The present invention relates to a molded circuit component for connecting lead wires of round cross section to electric wires of flat cross section in domestic, industrial or motor vehicle internal wiring.

2. Description of Related Art

Conventional methods and apparatus are known for connecting flat angular conductors of a flat electric cable to lead wires. In ne of the methods, the conductors and the lead wires are connected to each other through a printed circuit board by soldering. In another of the methods, the electric cable and the lead wires are coupled to separate connectors and the connectors are then mounted on a printed circuit board.

FIG. 1 (Prior Art) is a perspective view for describing a conventional method of connection. FIG. 1 shows a molded body 1, lead wires 2, a flat electric cable 3, flat angular conductors 4, crimped terminals 5, a comb-shaped spacer 6, and welded joints 7. To connect the flat electric cable 3 made of the flat angular conductors 4 to the lead wires 2 fitted with the crimped terminals 5 at the lead wire ends, the end portions of the flat angular conductors 4 are overlaid on those of the crimped terminals 5 and then spot welded thereto to comprise the welded joints 7 for the electrical connection. The lead wires 2 are then put in the spacer 6. The assembly of these members is thereafter put in the box-shaped molded body 1 and sealed with a molding resin.

To connect round cross section lead wires to flat electrical cable or round cross section lead wires to a printed circuit board, it is -necessary that the connectors are coupled to exposed terminals on the printed circuit board. The mutual contact surfaces of the connectors and the terminals are then soldered to each other in order to maintain reliable electrical stability of the connector contacts and the terminals and the mechanical strength of the contacts subject to vibration, especially in a motor vehicle, for extended periods of time. If some anxiety remains after the coupling and the soldering, the mutual contact surfaces can be spot welded to each other for higher reliability. In that case, the electrodes of a spot welder are set at the mutually overlaid portions of the terminals and the flat conductors of the cable and these portions are then vertically pressed together by the electrodes. However, the terminals and the flat conductors can shift rightward or leftward relative to each other. In other words, it is difficult to accurately position the terminals and the conductors with respect to each other. Furthermore, there is a possibility that the mutually coupled portions of the terminals and the conductors can be uncoupled from each other by an external force.

SUMMARY OF THE INVENTION

According to the present invention, the above-mentioned problems are solved by a molded circuit component for connecting lead wires and a method for manufacturing the same. A molded circuit component including a body and a protective cover is used. The body is made of a molding resin and has a partition wall area in which a plurality of housing grooves, partition walls, notches for fastening the lead wires, connection terminals, positioning projections and a plurality of fastening pin reception holes are provided at prescribed intervals so that the notches are located at front ends of the housing grooves and the projections are located on outer surfaces of the body and the partition walls. A plurality of metal lines are embedded in the body so that the lines comprise the connection terminals at the ends of the lines. The protective cover has recesses, fastening pins and notches corresponding to the projections, reception holes and notches of the body. In the method, the lead wires are housed in the housing grooves so that the conductors of the wires are located on the connection terminals. The conductors and the terminals are then pressed together by the electrodes of a spot welder and spot welded to each other. The protective cover is then fitted to the body and the molded circuit component is coated with molding resin.

With the foregoing in mind, other objects, features and advantages of the present invention will become more apparent upon consideration of the following description and the appended claims with reference to the accompanying drawings, all of which form part of this specification, wherein like reference numerals designate corresponding parts in the various figures.

DETAILED DESCRIPTION OF THE PREFERRED EXEMPLARY EMBODIMENTS

Figure 1:
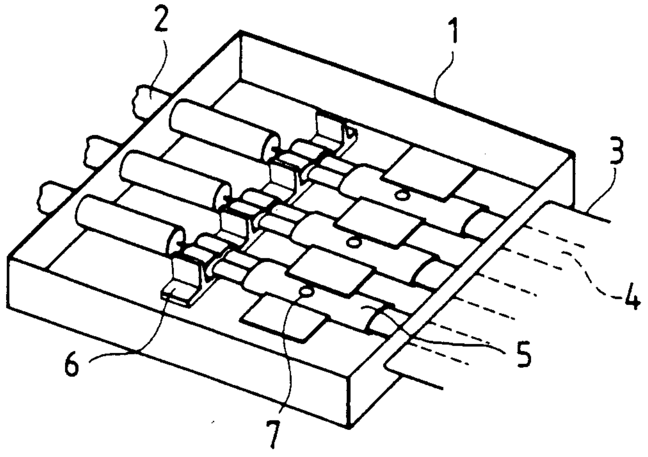
FIG. 1 PRIOR ART
FIG. 1 (Prior Art) is a perspective view for describing a conventional method of connection.
Figure 2:
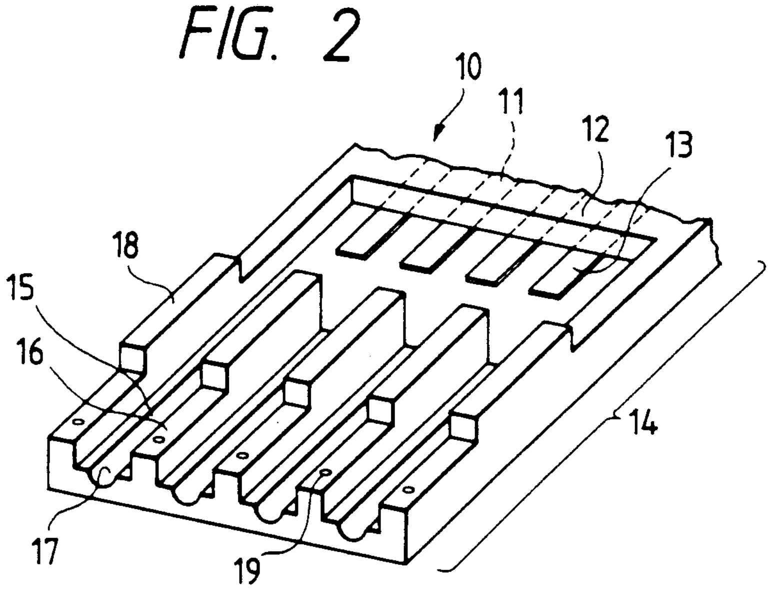
FIG. 2 is a perspective view of a molded circuit component which is an embodiment of the present invention.

FIG. 2 is a perspective view of a molded circuit component 10 which is an embodiment of the present invention. Shown in FIG. 2 are the component 10, metal lines II, the body 12 of the component, connection terminals 13, a partition wall area 14, housing grooves 15, partition walls 16, notches 17, projections 18, and reception holes 19. The component 10 is made of a thermoplastic resin. The connection terminals 13 are comprised of ends of the metal lines 11, and are disposed in parallel with each other and embedded in the body 12 made of molding resin. The partition wall area 14 is provided on the front portion of the body 12. The housing grooves 15, partition walls 16 and notches 17 are provided at prescribed intervals in the partition wall area 14. The notches 17 are for preventing lead wires from being pulled out of the component 10 and are located at the front portions of the housing grooves 16. The connection terminals 13 are exposed at the rear of the housing grooves 16. The partition wall area 14 has projections 18 and reception holes 19 for securing a protective cover 20 for protecting the mutually connected portions of the terminals 13 and the lead wires, if necessary.

Figure 3:
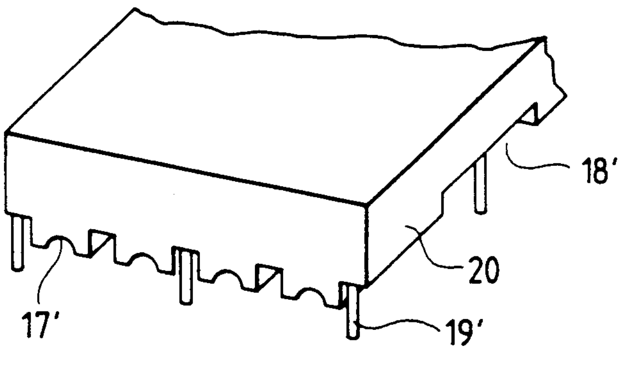
FIG. 3 is a perspective view of a protective cover.

FIG. 3 shows the protective cover 20 for protecting the partition wall area 14. The protective cover 20 has recesses 18', fastening pins 19' and notches 17' corresponding to the projections 18, reception holes 19 and notches 17 so that the protective cover 20 can be fitted over the partition wall area 14.

Figure 4:
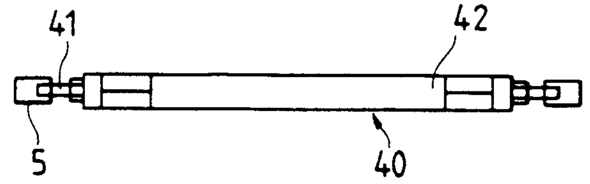
FIG. 4 is a side view of a lead wire having a round cross section and provided with a crimped terminal.

FIG. 4 shows a lead wire 40 which has a round cross section conductor 41 and a crimped terminal 5 so as to be used together with the molded circuit component 10. After an end of the lead wire 40 is removed of a coating insulator 42, the terminal 5 is put in contact with the conductor 41 and crimped so that the terminal 5 is attached to the lead wire 40.

Figure 5:
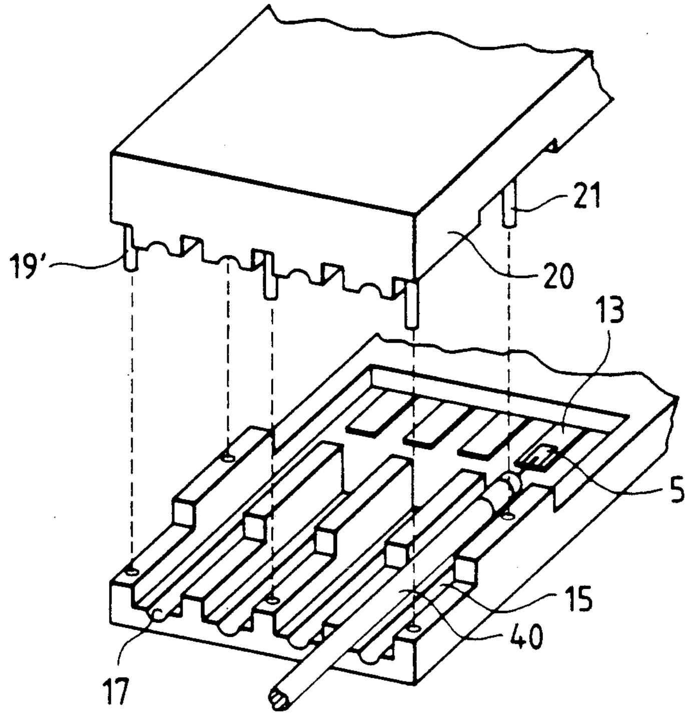
FIG. 5 is a perspective view of the component with a lead wire positioned in place.

FIG. 5 shows the lead wire 40 positioned in groove 15 and notch 17 of the molded circuit component 10 so that the terminal 5 is put in contact with the connection terminal 13 of the metal line 11. The terminals 5 and 13 are then welded to each other by the electrodes of a spot welder so that the lead wire 40 is connected to the metal line 11. The protective cover 20 is then fitted over the partition wall area 14 so that the projections 18 coincide with the recesses 18' and the reception holes 19 coincide with the fastening pins 19'. The interior of the component 10 is thus protected by the cover 20. The lead wire 40 is vertically pinched at the notches 17 and 17' so that the wire is prevented from being pulled of the housing groove 15.

Figure 6:
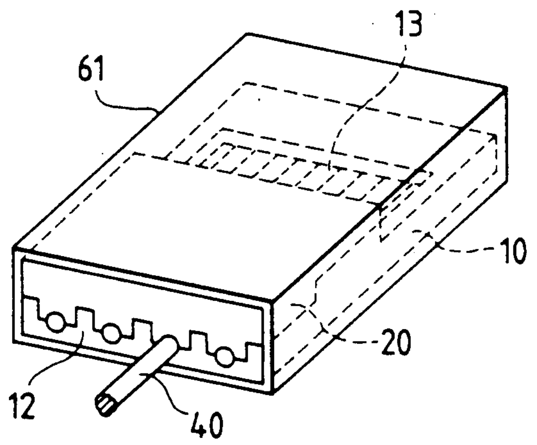
FIG. 6 is a perspective view of a molded unit.

FIG. 6 shows a molded unit 61 manufactured by molding a resin such as PBT and polyacetate on the molded circuit component 10 fitted with the protective cover 20 after the lead wires 40 are connected to the metal lines 11. The body 12 and the protective cover 20 protect the coating insulators 42 of the lead wires 40 from the heat of the high temperature resin in the molding.

If the connection terminals 13 are provided on a printed circuit board which includes an electrical insulator, the bottoms of the connection terminals are exposed so that the insulator will not come between the electrodes of the spot welder and prevent electrical current from flowing from one of the spot welder electrodes to the other.

Figure 7:
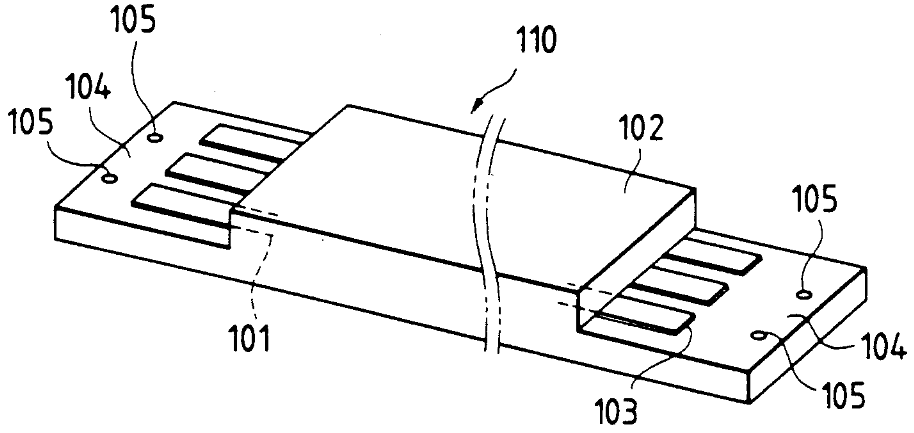
FIG. 7 is a perspective view of an alternative embodiment molded circuit component unit.
Figure 8:
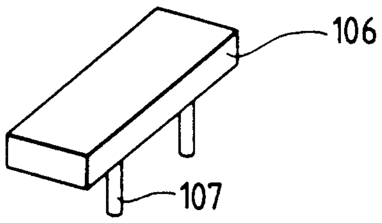
FIG. 8 is a perspective view of a fastening cover.

FIG. 7 shows an alternative embodiment of the present invention comprising molded circuit component unit 110, metal lines 101, body 102, connection terminals 103, connecting portions 104, and positioning holes 105. Connection terminals 103 comprise the ends of the metal lines 101 and are disposed in parallel with each other at the same intervals as the conductors of a flat electrical cable. The metal lines 101 are embedded in the body 102, which is made of a molding resin. The connecting portions 104 are also made of the molding resin and extend at both ends of the body 102 in the longitudinal direction of the metal lines 101. The positioning holes 105 ar- provided in the connecting portions 104 at opposite ends of the body 102. A fastening cover 106 for protecting the electrical cable is shown in FIG. 8 and is provided with fastening pins 107 in positions corresponding to those of the positioning holes 109.

Figure 9:
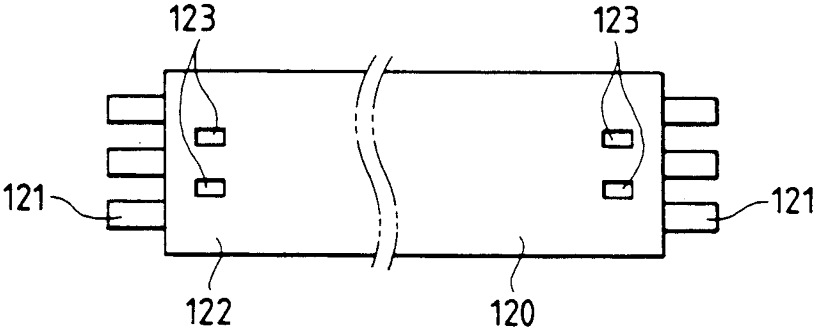
FIG. 9 is a top view of a flat electrical cable to be used with the molded circuit component unit.

FIG. 9 shows a flat electrical cable 120 for the molded circuit component unit 110. A coating insulator 122 is removed from the end of the electrical cable 120 so that the flat conductors 121 of the cable are exposed. The cable 120 has fastening pin penetration holes 123 in positions corresponding to those of the positioning holes 105 and fastening pins 107. The distance between the fastening pins 107 of the fastening cover 106 is predetermined so that the pins do not come into contact with the flat conductors 121 of the cable 120.

Figure 10:
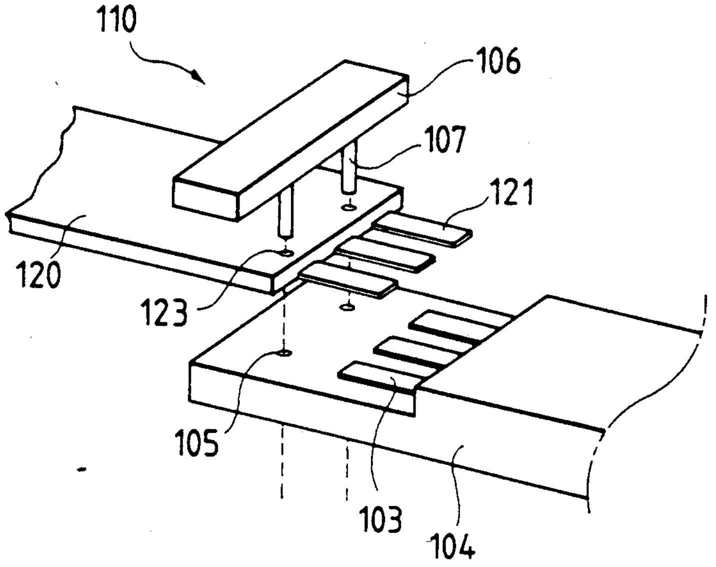
FIG. 10 is a perspective view of the molded circuit component unit with a flat electrical cable positioned in place.
Figure 11:
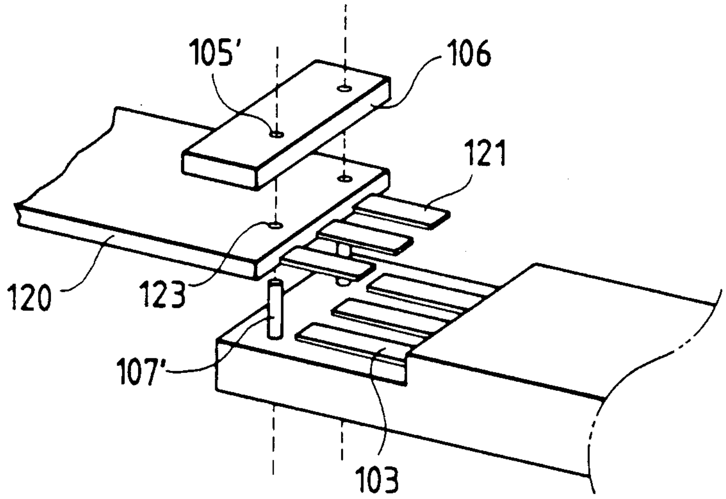
FIG. 11 is a perspective view of an alternative embodiment molded circuit component unit with a flat electrical cable positioned in place.

FIG. 10 shows the molded circuit component unit 110 and the flat electrical cable 120 being assembled together. The fastening pins 107 of the fastening cover 106 are put through the fastening pin penetration holes 123 of the cable 120 and the positioning holes 105 of the connecting portion 104. The cable 120 is fastened to the connecting portion 104 so as to not deviate in position relative thereto with the conductors 121 being overlaid on the connection terminals 103. After the unit 110 and the cable 120 are thus coupled to each other, they are embedded in a molding resin such as PBT and polyacetate.

FIG. II shows an alternative embodiment of the molded circuit component unit 110 and flat electric cable 120 being assembled together. Fastening pins 107' are provided on the connecting portions 104 of the unit 110 so that the pins are put through the fastening pin penetration holes 123 of the cable and the positioning holes 105' of a fastening cover 106 to fasten the cable 120 to the unit 110.

Figure 12:
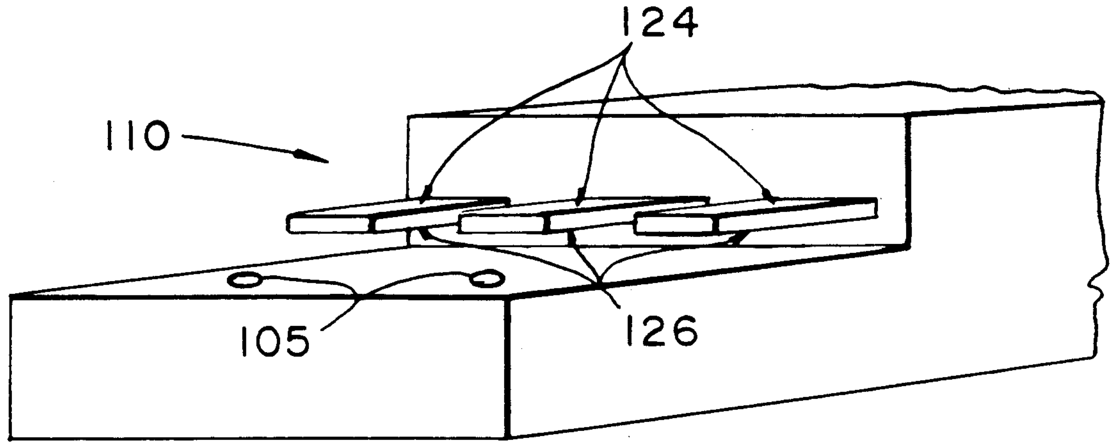
FIG. 12 shows an expanded top perspective view of connection terminals in FIG. 10 and FIG. 11.

In each of the embodiments shown in FIGS. 7–11, the thickness of the molding resin is reduced at and around the connection terminals 103 to expose the terminals on the tops 124 and bottoms 126 thereof (see FIG. 12) to allow an electrical current to flow through the terminal, the flat conductor 121 of the cable 120 and the electrodes of a spot welder when the terminal and the conductor are pressed together by the electrodes. It is thus easier to weld the terminal and the conductor to each other.

In a method provided in accordance with the present invention, the lead wires are placed in the housing grooves so that the wires are accurately positioned for the spot welding. Further, the coating insulators of the lead wires are prevented from melting due to the heat of the molding resin to prevent short-circuiting or insulation failure between the mutually adjacent conductors of the wires. Since the molded circuit component and the coating insulators of the lead wires at the connected ends thereof are integrated together in the form of a box by the molding, the reliability and resistance to the pulling-out of the connected portions thereof, the bedding of the component, humidity, chemicals and other environmental hazards is increased. It is preferable that the molded assembly of the component and the wires withstand pulling that could overstrain the component, wires and the connections therebetween.

While the invention has been described in accordance with what is presently conceived to be the most practical and preferred embodiment, it is to be understood that the invention is not to be limited to the disclosed embodiment but on the contrary, is intended to cover various modifications and equivalent arrangements included within the spirit and the scope of the appended claims, which scope is to be accorded the broadest interpretation of such claims so as to encompass all such equivalent structures.

What is claimed is:

1. A molded electrical circuit connector for connecting to lead wires, the connector comprising:

a molded body having a plurality of fastening pin reception apertures, comprising:

a plurality of partition walls having positioning projections and defining a plurality of housing grooves, each groove formed by two adjacent partition walls and having a notch at a bottom portion thereof the notches being positioned at front portions of the housing grooves; and a plurality of metal lines, each line having connection terminals at ends thereof, the connection terminals being exposed at rear portions of the housing grooves, the metal lines being embedded in the molded body; and a molded protective cover having a plurality of recesses corresponding to the plurality of positioning projections and a plurality of cover notches corresponding to the plurality of body notches, the molded protective cover including a plurality of fastening pins corresponding to the plurality of fastening pin reception apertures, whereby the lead wires can be positioned in the grooves such that the lead wires can be attached to connection terminals and the molded protective cover can be attached to the molded body.

2. A connector according to claim 1 wherein the connection terminals include means for supporting weldings attaching lead wires to the connection terminals.

3. A connector according to claim 2 wherein the welding comprises spot welding.

4. A connector according to claim 1 wherein the molded electrical circuit connector includes a coating of molding resin, the molded protective cover being attached to the molded body.

5. A connector according to claim 1 wherein the material composition of molded body includes molding resin.

6. A connector according to claim 1 wherein the material composition of molded protective cover includes molding resin.

7. A molded electrical connector for connecting to a flat electrical cable having a plurality of conductors spaced at intervals from each other and a plurality of fastening pin penetration apertures, the molded circuit connector comprising:

a molded body comprising:

a plurality of metal lines being embedded in the molded body, each line having connection terminals at ends thereof, the connection terminals being positioned parallel to each other such that each flat electrical cable conductor can be positioned on a corresponding connection terminal, the connection terminals being secured to the body by molding resin and having means for supporting weldings joining the flat electrical cables to the connection terminals; and at least one connecting portion extending from at least one end of the molded body in a direction parallel to the metal lines, each connecting portion having a plurality of positioning apertures; and a fastening cover for covering a connecting portion, the fastening cover having a plurality of fastening pins for engaging the connecting portions by the positioning apertures and for engaging the flat electrical cable by the fastening pin penetration apertures, such that the flat electrical cable can be fastened to the molded body, the fastening pins being positioned such that they do not come into contact with the flat electrical cable conductors.

8. A molded electrical connector for connecting to a flat electrical cable having a plurality of conductors spaced at intervals from each other and a plurality of fastening pin penetration apertures, the molded circuit connector comprising:

a fastening cover having a plurality of positioning apertures;

a molded body comprising:

a plurality of metal lines embedded in the molded body, each line having connection terminals at ends thereof, the connection terminals being positioned parallel to each other such that each flat electrical cable conductor can be positioned on a corresponding connection terminal, and the connection terminals being secured to the body by molding resin and having means for supporting weldings joining the flat electrical cables to the connection terminals; and at least one connecting portion extending from at least one end of the molded body in a direction parallel to the metal lines, each connecting portion having a plurality of fastening pins for engaging the flat electrical cable by the fastening pin penetration apertures and for engaging the fastening cover by the positioning apertures, such that the flat electrical cable can be fastened to the molded body, the fastening pins being positioned such that they do not come into contact with the flat electrical cable conductors.

9. A molded electrical connector for connecting to a flat electrical cable having a plurality of conductors spaced at intervals from each other and a plurality of fastening pin penetration apertures, the molded circuit connector comprising:

a molded body comprising:

a plurality of metal lines embedded in the molded body, each line having connection terminals at ends thereof, the connection terminals being positioned parallel to each other such that each flat electrical cable conductor can be positioned on a corresponding connection terminal, the connection terminals being secured to the body by molding resin and having means for supporting spot weldings joining the flat electrical cables to the connection terminals; and at least one connecting portion extending from at least one end of the molded body in a direction parallel to the metal lines, each connecting portion having a plurality of positioning apertures; and a fastening cover for covering a connecting portion, the fastening cover having a plurality of fastening pins for engaging the connecting portion by the positioning apertures and for engaging the flat electrical cable by the fastening pin penetration apertures, such that the flat electrical cable can be fastened to the molded body, the fastening pins being positioned such that they do not come into contact with the flat electrical cable conductors.

10. A molded electrical connector for connecting to a flat electrical cable having a plurality of conductors spaced at intervals from each other and a plurality of fastening pin penetration apertures, the molded circuit connector comprising:

a fastening cover having a plurality of positioning apertures;

a molded body comprising:

a plurality of metal lines embedded in the molded body, each line having connection terminals at ends thereof, the connection terminals being positioned parallel to each other such that each flat electrical cable conductor can be positioned on a corresponding connection terminal, the connection terminals being secured to the body by molding resin and having means for supporting spot weldings joining the flat electrical cables to the connection terminals; and at least one connecting portion extending from at least one end of the molded body in a direction parallel to the metal lines, each connecting portion having a plurality of fastening pins for engaging the flat electrical cable by the fastening pin penetration apertures and for engaging the fastening cover by the positioning apertures, such that the flat electrical cable can be fastened to the molded body, the fastening pins being positioned such that they do not come into contact with the flat electrical cable conductors.

11. A molded electrical connector for connecting to a flat electrical cable having a plurality of conductors spaced at intervals from each other and a plurality of fastening pin penetration apertures, the molded circuit connector comprising: a molded body comprising:

a plurality of metal lines embedded in the molded body, each line having connection terminals at ends thereof, the connection terminals being positioned parallel to each other such that each flat electrical cable conductor can be positioned on a corresponding connection terminal, the connection terminals being secured to the body by molding resin and having means for supporting weldings joining the flat electrical cables to the connection terminals, and each connection terminal being exposed at both its top surface and its bottom surface to facilitate welding of the connection terminal to a flat electrical cable conductor; and at least one connecting portion extending from at least one end of the molded body in a direction parallel to the metal lines, each connecting portion having a plurality of positioning apertures; and a fastening cover for covering a connecting portion, the fastening cover having a plurality of fastening pins for engaging the connecting portion by the positioning apertures and for engaging the flat electrical cable by the fastening pin penetration apertures, such that the flat electrical cable can be fastened to the molded body, the fastening pins being positioned such that they do not come into contact with the flat electrical cable conductors.

12. A molded electrical connector for connecting to a flat electrical cable having a plurality of conductors spaced at intervals from each other and a plurality of fastening pin penetration apertures, the molded circuit connector comprising:

a fastening cover having a plurality of positioning apertures;

a molded body comprising:

a plurality of metal lines embedded in the molded body, each line having connection terminals at ends thereof, the connection terminals being positioned parallel to each other such that each flat electrical cable conductor can be positioned on a corresponding connection terminal, the connection terminals being secured to the body by molding resin and having means for supporting weldings joining the flat electrical cables to the connection terminals, and each connection terminal being exposed at both its top surface and its bottom surface to facilitate welding of the connection terminal to a flat electrical cable conductor; and at least one connecting portion extending from at least one end of the molded body in a direction parallel to the metal lines, each connection portion having a plurality of fastening pins for engaging the flat electrical cable by the fastening pin penetration apertures and for engaging the fastening cover by the positioning apertures, such that the flat electrical cable can be fastened to the molded body, the fastening pins being positioned such that they do not come into contact with the flat electrical cable conductors.

* * * * *